(12) United States Patent
Tsuji

(10) Patent No.: US 7,026,601 B2
(45) Date of Patent: Apr. 11, 2006

(54) SENSOR SYSTEM, AND SENSOR APPARATUS AND RECEPTION APPARATUS USED IN THE SENSOR SYSTEM

(75) Inventor: Masatoshi Tsuji, Otsu (JP)

(73) Assignee: Optex Co., Ltd., Shiga (JP)

(*) Notice: Subject to any disclaimer, the term of this patent is extended or adjusted under 35 U.S.C. 154(b) by 0 days.

(21) Appl. No.: 11/073,680

(22) Filed: Mar. 8, 2005

(65) Prior Publication Data
US 2005/0194553 A1    Sep. 8, 2005

(30) Foreign Application Priority Data
Mar. 8, 2004    (JP) .............................. 2004-063739

(51) Int. Cl.
*G08B 13/18*    (2006.01)
*H01J 40/14*    (2006.01)
(52) U.S. Cl. .................... 250/221; 250/338.1; 340/541; 340/552
(58) Field of Classification Search ................ 250/221, 250/222.1, 338.1; 340/541, 552, 554, 555, 340/565
See application file for complete search history.

(56) References Cited

U.S. PATENT DOCUMENTS

2003/0122514 A1*   7/2003   Mercier et al. ............. 318/280
2004/0032326 A1*   2/2004   Nakamura et al. .......... 340/567

FOREIGN PATENT DOCUMENTS

JP    2002-55173    2/2002
JP    2003-207462   7/2003

* cited by examiner

*Primary Examiner*—Kevin Pyo
(74) *Attorney, Agent, or Firm*—Wenderoth, Lind & Ponack, L.L.P.

(57) ABSTRACT

For a carrier wave carrying a microwave from an MW sensor 1, pulse intervals are varied between when the MW sensor 1 generates an alert and when the MW sensor 1 does not generate an alert. When checking a sensing area, an operator carries a receiver being able to receive a transmitted wave from the MW sensor 1, walks around an area thought to be the sensing area and checks a monitor screen of the receiver. In this way, the sensing area can be checked at hand by the operator.

15 Claims, 6 Drawing Sheets when both sensors do not detect an object when only MW sensor detects an object when only PIR sensor detects an object when both sensors detect an object when an object is not detected when an object is detected (a)

(b)

when both sensors
do not detect an
object when only MW sensor
detects an object when only PIR sensor
detects an object when both sensors
detect an object

SENSOR SYSTEM, AND SENSOR APPARATUS AND RECEPTION APPARATUS USED IN THE SENSOR SYSTEM

BACKGROUND OF THE INVENTION

This application claims priority under 35 USC 119(a) to Patent Application No. 2004-063739 filed in Japan on 8 Mar., 2004, the content of which is hereby incorporated herein by reference in its entirety.

The Invention relates to a sensor system comprising a sensor apparatus represented by, for example, a microwave sensor (hereinafter referred to as a "MW sensor"), and a sensor apparatus used in the sensor system and a reception apparatus used in combination with the sensor apparatus. Especially, the invention relates to a solution for enabling a sensing area of the sensor apparatus to be checked easily and accurately.

Conventionally, as one of sensors used as a security apparatus and the like, a MW sensor is known for transmitting microwaves to a detection area (a monitoring area) and, if a human body (an detection target object) exits in the detection area, receiving reflected waves from the human body (microwaves modulated by the Doppler effect) to detect the human body (an intruder) (e.g., Japanese Patent Application Laid-Open Publication No. 2003-207462).

Also, this type of the MW sensor may be used in combination with a PIR sensor receiving infrared radiations from a human body within the detection area to detect the intruder from a difference between a temperature of the human body and an ambient temperature (e.g., Japanese Patent Application Laid-Open Publication No. 2002-55173). In other words, by overlapping the detection area of the MW sensor and the detection area of the RIP sensor and by obtaining the AND of both detected counts, weaknesses of the both sensors are complemented and the credibility is enhanced against causes of false alerts. As used herein, the weaknesses of the both sensors can be cited as false alerts in the MW sensor due to effects of external electric waves and false reports in the PIR sensor due to effects of sunlight and the like. Specifically, a beam range (a range where infrared radiations from a human body can be received) of the PIR sensor is set up off the ground and, thereby, the detection area and the non-detection area are partitioned. Therefore, when a large object (e.g., a cargo truck or a train) passes through the vicinity of the combination sensor and is detected by the MW sensor (the MW sensor generates an alert), if the object is located outside of the detection area set by the PIR sensor (outside of the beam range), the combination sensor can considers that the object is not detected (an alert is not generated).

By the way, in installation operations for the MW sensor, by setting sensing areas of the sensors to be desired areas, installation must be done such that human bodies are not recognized in areas not required to be monitored, in other words, such that human bodies are accurately recognized in areas required to be monitored. Therefore, after installing the MW sensor, an operation must be performed for checking the sensing area. For traditional checking operations, a MW sensor has been provided with a light-emitting unit for emitting lights or a speaker for making sounds, and after installing the sensor, an operator has been walking around an area thought to be the sensing area, has checked emissions of lights or sounds from the MW sensor and has determined whether the point of the operator has been set as the sensing area or not (whether the point has been included in the area where a human body can be detected by the MW sensor).

However, these checking operations have problems stated below.

First, in the case of the sensor with the light-emitting unit for emitting lights when a human body is detected, if the MW sensor is installed outdoor, a light-emitting status of the light-emitting unit is difficult to be identified in daytime checking operations, and especially if the sensing area is extensively defined (for example, if the sensing area is defined up to a point 100 m away from the MW sensor installation point), the light-emitting status of the light-emitting unit is almost impossible to be checked with eyes of the operator since a distance between the operator and the sensor is too far. Although, in order to easily check the light-emitting status with eyes, a large light-emitting unit must be provided or an amount of the emission must be increased, this can cause troubles such that the design of the MW sensor is adversely affected or that power consumption of a built-in battery is increased.

Also, in the case of the sensor with the speaker, if the sensing area is extensively defined, sounds from the speaker is difficult to be heard by the operator since a distance between the operator and the sensor is too far. Although, in order to here the sounds from the speaker easily, the sounds from the speaker must be set louder, this can cause troubles such that the power consumption of the built-in battery is increased as above, as well as that noise problems occur.

As a solution for these troubles, one can consider to locate an operator for checking the emission of lights or generation of sounds in the vicinity of the MW sensor, however, in this way, not only multiple operators are required, but also operations become complicated since the operators must check the sensing area while talking with each other by equipments such as transceivers.

These problems are posed not only when the MW sensor is used independently, but also the combination sensor described above is used. In other words, for the combination sensor, the check must be done for the sensing area of the MW sensor and the sensing area of the PIR sensor, and the same problems as above are generated in these checking operation. Also, this is not limited to the case that the microwave sensor and infrared radiations are used, and the same applies to sensors using other sensing signal waves.

SUMMARY OF THE INVENTION

The invention is devised in terms of such considerations and purpose thereof is to provide a sensor system and a sensor apparatus used in the sensor system and a reception apparatus used in combination with the sensor apparatus for enabling a sensing area of the sensor apparatus to be checked easily and accurately without needing means for light-emissions and sound generation in the sensor apparatus (MW sensor in the case above) and without needing multiple operator.

As means for a solution of the invention, information on whether a sensor apparatus is detecting an object (generating an alert) or not is included in sensing waves transmitted by the sensor apparatus to a detection target area for detecting the object. By receiving the information with a dedicated reception apparatus, even in the place distant from the sensor apparatus (even at the point where an operator performs checking operations of a sensing area), the operator can easily check whether the operator's current stand location is set as the sensing area.

Specifically, the invention assumes a sensor system comprising a sensor apparatus transmitting a sensing signal wave to a detection target area to recognize presence of a detection target object in the detection target area. In the sensor system, the sensor apparatus is configured such that a transmission status of the transmitted sensing signal wave is varied between the case of deciding that the detection target object does not exist in the detection target area and the case of deciding that the detection target object exists in the detection target area. Also, the sensor apparatus is comprised of a reception apparatus having an identification means for identifying the transmission status of the sensing signal wave by receiving the sensing signal wave and a notification means for receiving a signal from the identification means to notify whether the sensor apparatus decides that the detection target object exists in the detection target area or not.

In this specific regard, when the operator performs operations for checking the sensing area after installing the sensor apparatus, the operator carries the reception apparatus and checks the notification status from the notification means of the reception apparatus while walking around the area thought to be the sensing area. The transmission status of the sensing signal waves is different between the case that the operator is within the sensing area and the case that the operator is outside of the sensing area, and the difference is identified by identification means and notified to the operator by the notification means (notification through screen display or sounds). In other words, the operator can easily check from the notification status of the notification means whether the operator's current stand location is within the sensing area or outside of the sensing area. In this way, since the sensing area of the sensor apparatus can be checked at hand by the operator, the conventional configuration such as providing a light-emitting unit or a speaker in the sensor apparatus is not required so as to eliminate deterioration of the design of the sensor apparatus, the increase of the power consumption of the built-in battery and occurrences of noise problems, and the operator can accurately check the sensing area alone.

Specifically, as the changes of the transmission status of the sensing signal waves used as the information on whether the sensor apparatus is detecting an object (generating an alert), the followings may be listed. First, the sensing signal wave consists of a carrier wave consisting of a pulse wave and a sensing wave carried by the carrier wave, and at least one of a pulse interval, pulse length and pulse amplitude of the carrier wave is varied between the case of deciding that the detection target object does not exist in the detection target area and the case of deciding that the detection target object exists in the detection target area.

Also, the sensing signal is a sensing wave output continuously, and at least one of a frequency, a changeover from the continuous output to the intermittent output and a phase of the sensing wave is varied between the case of deciding that the detection target object does not exist in the detection target area and the case of deciding that the detection target object exists in the detection target area.

Further, if the sensor apparatus is configured as a combination sensor consisting of a microwave sensor and an infrared sensor, as the changes of the transmission status of the sensing signal waves, the followings may be listed. The sensor apparatus is a combination sensor comprising the microwave sensor for transmitting a microwave to the detection target area and for receiving a reflected wave which is the microwave reflected by the detection target object and modulated by the Doppler Effect if the detection target object exists in the detection target area and the infrared sensor for receiving infrared radiations from the detection target object existing in the detection target area to detect the detection target object, which generates an alert if the both sensors detect the detection target object. The transmission status of the sensing signal wave is varied when only the microwave sensor decides that the detection target object exists in the detection target area, when only the infrared sensor decides that the detection target object exists in the detection target area, when both sensors decide that the detection target object exists in the detection target area and when both sensors decide that the detection target object does not exist in the detection target area, respectively.

Also as the change of the transmission status of the sensing signal wave in this case, as is the case above, if the sensing signal wave consists of the carrier wave and the sensing wave, the change is made in at least one of the pulse interval, pulse length and pulse amplitude of the carrier wave. If the sensing signal wave is used as the sensing wave output continuously, the change is made in at least one of the frequency, the changeover from the continuous output to the intermittent output and the phase of the sensing wave.

The technical concept of the invention includes the sensor apparatus used in any one of the above sensor systems. The sensor apparatus is configured such that the transmission status of the sensing signal wave is varied between the case of deciding that the detection target object does not exist in the detection target area and the case of deciding that the detection target object exists in the detection target area. Specifically, the sensor apparatus consists of a microwave sensor for transmitting a microwave to the detection target area and for recognizing the presence of the detection target object by receiving a reflected wave which is the microwave reflected by the detection target object and modulated by the Doppler Effect if the detection target object exists in the detection target area.

Further, the technical concept of the invention includes the reception apparatus used in any one of the above sensor systems. The reception apparatus is comprised of an identification means for identifying the transmission status of the sensing signal wave by receiving the sensing signal wave transmitted by the sensor apparatus and a notification means for receiving a signal from the identification means to notify whether the sensor apparatus decides that the detection target object exists in the detection target area or not.

In the invention, as described above, the information on whether the sensor apparatus is detecting an object (generating an alert) or not is included in the sensing signal wave transmitted to the detection target area by the sensor apparatus for detecting an object. Therefore, even in the place distant from the sensor apparatus, the operator can easily check whether the operator's current location is set as the sensing area. Also, the conventional configuration such as providing a light-emitting unit or a speaker in the sensor apparatus is not required so as to eliminate deterioration of the design of the sensor apparatus, the increase of the power consumption of the built-in battery and occurrences of noise problems, and the operator can accurately check the sensing area alone to enable the sensing area to be checked accurately by extremely simple operations. Also, since the sensing area can be checked by effectively utilize the sensing signal wave with primary purpose of sensing and by receiving the sensing signal wave, a special transmitter is not needed and the system configuration is not complicated.

DESCRIPTION OF PREFERRED EMBODIMENT

Hereinafter, embodiments of the invention will be described based on the drawings. In order to facilitate understanding of the invention, as a first embodiment, descriptions are made for the case that the invention is applied when only an MW sensor (two-frequency type) is used as a sensor apparatus. Since the MW sensor is often combined with a PIR sensor in actual usage patterns, as a second embodiment, descriptions are made for the case that the invention is applied to the combination sensor.

(First Embodiment)

[Description of Configuration of MW Sensor]

Figure 1:
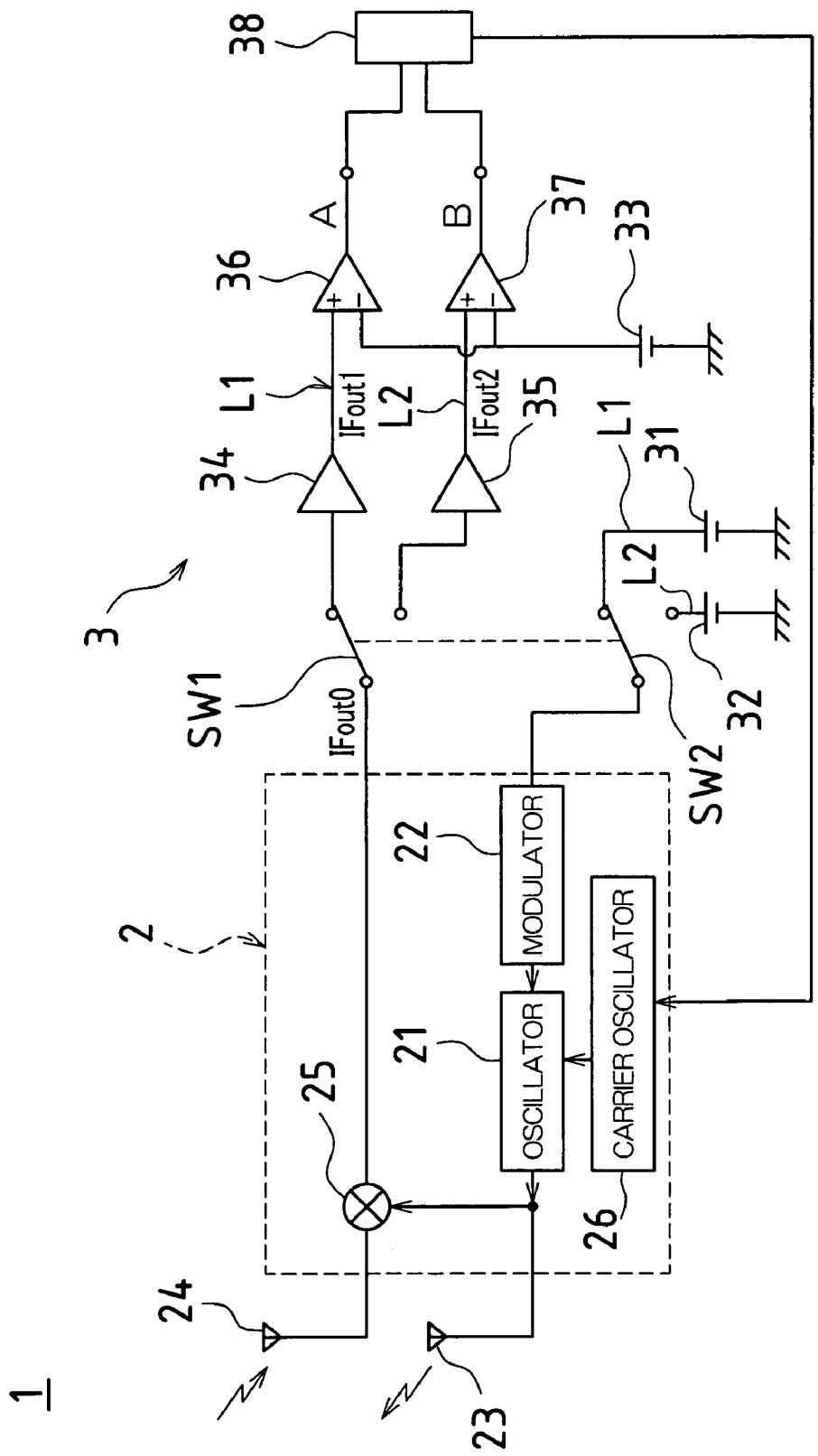
FIG. 1 is a block diagram showing a circuit configuration of a MW sensor in a sensor system according to a first embodiment of the invention.

FIG. 1 shows a circuit configuration of a MW sensor 1 as a sensor apparatus according to the embodiment. As shown in this figure, the MW sensor 1 is provided with an RF module 2 and a signal processing unit 3.

The RF module 2 is comprised of an oscillator 21 for oscillating microwaves, a modulator 22 for switching frequencies of microwaves oscillated by the oscillator 21, a transmitting antenna 23 for transmitting to a detection target area the microwaves oscillated by the oscillator 21, a receiving antenna 24 for receiving reflected waves of the microwaves reflected by an object such as a human body, and a mixer 25 for mixing and outputting the received microwaves and voltage waveforms of the oscillator 21. In other words, if a human body or the like exists in the detection target area, the microwave transmitted by the transmitting antenna 23 to the detection target area is modulated by the Doppler Effect to a frequency of the reflected wave from the human body or the like. The received reflected wave is mixed with the voltage wave form of the oscillator 21 by the mixer 25 and is then output to the signal processing unit 3 as an IF output signal (IFout0) from the RF module 2.

On the other hand, the signal processing unit 3 is comprised of a first output line L1 and a second output line L2 corresponding to the microwave with each frequency transmitted from the transmitting antenna 23. Each line L1, L2 is provided with power sources 31, 32 and 33, an IF amplifier 34 and 35 and a comparator 36 and 37, and an object decision unit 38 is provided on the output side of the comparators 36 and 37

Each IF amplifier 34 and 35 is connected to the output side of the RF module 2 via a first switch SW1. The first switch SW1 is connected with the first output line L1 if one of the two (2) microwaves is transmitted by the transmitting antenna 23, and is switched and connected to the second output line L2 if the other microwave is transmitted by the transmitting antenna 23. In other words, when one microwave is transmitted, the IF output signal relating to the reflected wave reflected by a human body or the like (IFout1) is output to the first output line L1, and when the other microwave is transmitted, the IF output signal relating to the reflected wave reflected by a human body or the like (IFout2) is output to the second output line L2.

Each power source 31 and 32 is connected to the input side of the RF module 2 via a second switch SW2 interlocked with the first switch. The second switch SW2 also switches a connection status to each power source 31 and 32 depending on which microwave of two (2) microwaves is transmitted from the transmitting antenna 23. In other words, Depending on whether the second switch SW2 is connected with one power source 31 or the other power source 32, the modulator 22 switches frequencies of the microwave and thereby switches frequencies of the microwaves transmitted from the transmitting antenna 23.

In this way, corresponding to switchover operations of each switch SW1, SW2, switchovers are performed at predetermined time intervals (e.g., a few msec) between a first processing operation for executing signal processing in the first output line L1 by transmitting a microwave with one frequency from the transmitting antenna 23 to the detection target area and by outputting the IF output signal (IFout1) based on the reflected wave to the first line L1 of the signal processing unit3 and a second processing operation for executing signal processing in the second output line L1 by transmitting a microwave with the other frequency from the transmitting antenna 23 to the detection target area and by outputting the IF output signal (IFout2) based on the reflected wave to the second line L2 of the signal processing unit3. In each processing operation, the IF output signal output from the RF module 2 is amplified by the IF amplifier 34, 35, and the output from the IF amplifier 34 and 35 is formed into a rectangular wave by the comparator 36 and 37 and is then output to the object decision unit 38.

Further describing the each processing operation in detail, if no object such as a human body exists in the detection target area, frequencies are the same between the microwave transmitted from the transmitting antenna 23 and the microwave received by the receiving antenna 24 and, therefore, an IF frequency becomes "0" for the output signals from the IF amplifiers 34 and 35, and no signal is output from the comparators 36 and 37. Contrary to this, if a human body or the like exists in the detection target area, the microwave received by the receiving antenna 24 is modulated from the frequency of the microwave transmitted from the transmitting antenna 23 and, therefore, changes in output signal waveforms are generated in the comparators 36 and 37, and these rectangular waves are output to the object decision unit 38.

The object decision unit 38 receives the output signal waveform of the each comparator 36 and 37 and, based on this, decides whether a detection object (a human body or the like) exists in the detection target area or not and measures a distance to the detection object. Also, the object decision unit 38 measures a variation of the distance to the detected object per unit time to decide whether the object in the detection target area is an object which should be detected (a human body of an intruder) or not based on the result, and only if the object is the object which should be detected, an object detection signal is transmitted. Specifically, the distance to the object is calculated for each predetermined time, and only if the variation of the distance per unit time (e.g., 2 seconds) is greater than a predefined value (e.g., 1.5 m), the object decision unit 38 transmits the object detection signal (generates an alert, such as an alert to a security company).

A characteristic of the MW sensor 1 of the embodiment is that a transmission status of the microwave, i.e., the sensing signal wave is changed between the case of deciding that the detection target object (the human body or the like) does not exist in the detection target area and the case of deciding that the detection target object exists in the detection target area. Hereinafter, descriptions are made in detail.

The microwave oscillated by the oscillator 21 is transmitted to the detection target area from the transmitting antenna 23 with a carrier wave (carrier) consisting of a pulse wave. In other words, only when the carrier wave (pulse wave) is ON, the microwave with a predetermined frequency (e.g., 1 GHz) is transmitted from the transmitting antenna 23 to the detection target area. The RF module 2 is provided with a carrier oscillator 26 for oscillating this carrier wave. In other words, the microwave with the frequency set by the modulator 22 is oscillated by the oscillator 21, is carried on the carrier wave oscillated by the carrier oscillator 26 and is transmitted from the transmitting antenna 23 to the detection target area.

Figure 2A:
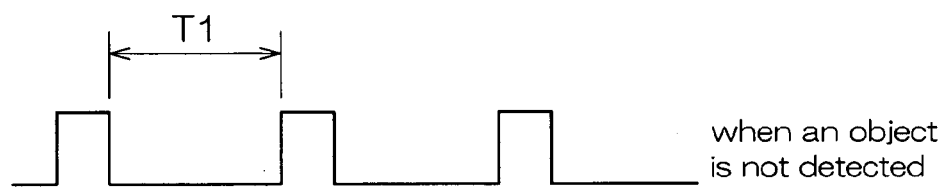
FIG. 2A is a diagram showing a changing status of a pulse interval of a pulse waveform of a carrier wave at the time of not detecting an object.
Figure 2B:
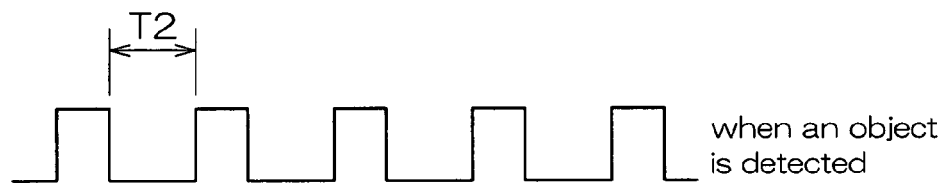
FIG. 2B is a diagram showing a changing status of the pulse interval of the pulse waveform of the carrier wave at the time of detecting an object.

The carrier oscillator 26 can receive the object detection signal from the object decision unit 38 and is configured such that pulse intervals of the carrier wave is changed between when the object detection signal is not received (when the MW sensor 1 decides that an object does not exist in the detection target area) and when the object detection signal is received (when the MW sensor 1 decides that an object exists in the detection target area). Specifically, as shown in FIG. 2A and FIG. 2B, the pulse intervals (T2) of the carrier wave when receiving the object detection signal (see FIG. 2B) is set shorter than the pulse intervals (T1) of the carrier wave when not receiving the object detection signal (see FIG. 2A). Therefore, for the microwave transmitted from the transmitting antenna 23 to the detection target area, the transmission intervals are longer when the object does not exist in the detection target area and shorter when the object exists in the detection target area. The pulse intervals of the carrier wave may be changed in only one or both microwaves of two (2) microwaves transmitted from the transmitting antenna 23 to the detection target area.

[Configuration of Receiver]

A receiver 4 is provided in a sensor system to which the MW sensor 1 is applied and the receiver 4 is used in combination with the MW sensor 1. Hereinafter, the receiver 4 is described.

Figure 3:
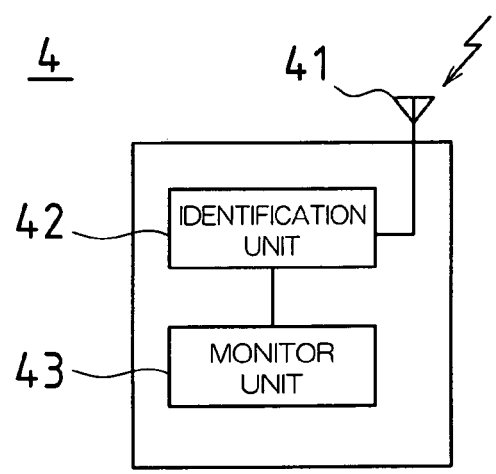
FIG. 3 is a block diagram showing a schematic configuration of a receiver.

FIG. 3 is a block diagram showing a schematic configuration of the receiver. As shown in FIG. 3, the receiver 4 is comprised of an antenna 41 for receiving microwaves from the MW sensor 1 and, as identification means of the invention, an identification unit 42 for identifying reception intervals of the microwave received by the antenna 41, upon receiving of the microwave. Therefore, in the receiver 4, when the MW sensor 1 decides that an object does not exist in the detection target area (the no-alert generated state), the reception status of the microwave has relatively longer intervals (T1 above) and, on the other hand, when the MW sensor 1 decides that an object exists in the detection target area (the alert generated state), the reception status of the microwave has relatively shorter intervals (T1 above). In other words, by recognizing the reception status of the microwave in the receiver 4 (the microwave reception intervals determined by the carrier wave), the identification unit 42 identifies whether the MW sensor 1 generates an alert or not.

The receiver 4 is provided with, as notification means of the invention, a monitor unit 43, which has a monitor screen, for receiving the identification signal from the identification unit 42, and when receiving the microwave with the relatively shorter intervals (T2 above), the monitor screen of the monitor unit 4 displays that the MW sensor 1 is in the state of deciding that an object exists in the detection target area (the alert generated state).

[Sensing Area Checking Operation]

Then, descriptions are made for a sensing area checking operation performed when an MW sensor 1 is installed. This checking operation is a work operation for checking whether the sensing area of the MW sensor 1 is set to a desired area so as to accurately recognize only an object with in an area needed to be monitored.

After the MW sensor 1 is installed in predetermined position (e.g., on a wall of a building or the like), an operator carries the receiver 4, walks around an area thought to be the sensing area and checks the monitor screen of the receiver 4. On this occasion, if the operator stands outside of the sensing area, the monitor screen of the receiver 4 does not perform a display operation (or displays that the MW sensor 1 is in the non-alert generated state), and if the operator stands within the sensing area, the monitor screen of the receiver 4 displays that the MW sensor 1 is in the alert generated state.

In this way, the operator can easily check the sensing area of the MW sensor 1 by performing a work operation for checking the monitor screen of the receiver 4 while walking around in the vicinity of the sensing area. If it is decided by this checking operation that the sensing area is too large, the setting is changed such that the output of the microwave is decreased, and on the other hand, if it is decided that the sensing area is too small, the setting is changed such that the output of the microwave is increased. In this way, the sensing area of the MW sensor 1 can be set to the desired area.

As described above, in the embodiment, since the sensing area of the MW sensor 1 can be checked at hand by the operator, the conventional configuration such as providing a light-emitting unit or a speaker in the MW sensor 1 is not required so as to eliminate deterioration of the design of the MW sensor 1, the increase of the power consumption of a built-in battery and occurrences of noise problems, and the operator can accurately check the sensing area alone. Also, since the microwave radiated from the MW sensor 1 has enough electric power within the sensing area, the relatively simple receiver 4 can easily receive the microwave. In other words, since the reception electric power of the MW sensor 1 is ¼ power of distance and the reception electric power of the receiver 4 is ½ power of distance, the receiver has enough electric power for reception operations.

In the first embodiment, the pulse intervals of the carrier wave are varied between when the MW sensor 1 detects an object and when the MW sensor 1 does not detect an object. The invention is not limited to this, and pulse length of the carrier wave may be varied, or pulse amplitude of the carrier wave (the output level of the carrier wave) may be varied. For example, when the MW sensor 1 detects an object, the pulse length may be set longer than when the MW sensor 1 does not detect an object, or when the MW sensor 1 detects an object, the pulse amplitude may be set greater than when the MW sensor 1 does not detect an object. Also, these (the change in the pulse interval, the change in the pulse length and the change in the pulse amplitude) may be combined with each other. Further, when the carrier wave is not the pulse wave and the microwave is continuously output, the frequency or the phase of the microwave may be varied between when the MW sensor 1 detects an object and when the MW sensor 1 does not detect an object. For example, when the MW sensor 1 detects an object, the frequency of the microwave may be set higher than when the MW sensor 1 does not detect an object, or when the MW sensor 1 make the transition from the state of not detecting an object to the state of detecting an object, the phase of the microwave may be inverted. Further, these (the change in the frequency of the microwave and the phase inversion of the microwave) may be combined with each other. Further, the continuous output may be changed to the intermittent output (e.g., the continuous output is used in the non-detection state and the intermittent output is used in the detection state).

(Second Embodiment)

Then descriptions are made for an embodiment in the case that a combination sensor is applied to the invention as the sensor apparatus that combines the MW sensor with the PIR sensor.

[Description of Configuration of Combination Sensor]

Figure 4A:
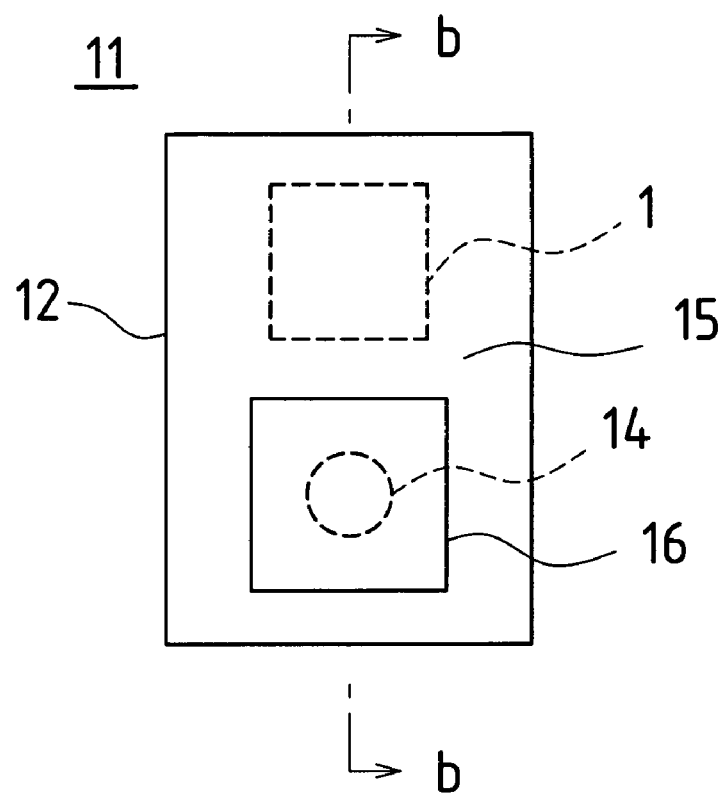
FIG. 4A is a front view of a combination sensor according to the second embodiment of the invention.
Figure 4B:
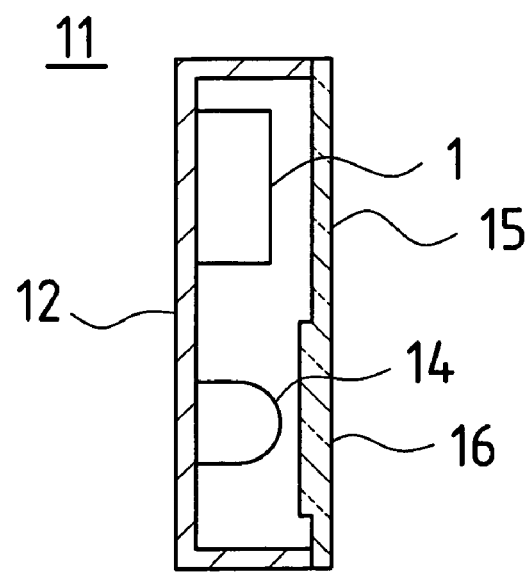
FIG. 4B is a cross-section diagram along the b—b line of FIG. 4A.

FIG. 4A and FIG. 4B show a combination sensor 11 according to the embodiment. FIG. 4A is a front view of the combination sensor 11, and FIG. 4B is a cross-section diagram along the b—b line of FIG. 4A. In the combination sensor 11, a case 12 contains the MW sensor 1 and PIR sensor 14; the front face of the case 12 is covered with a cover 15 transparent to the microwave; and the front face of the PIR sensor 14 is formed by a Fresnel lens 16.

Figure 5A:
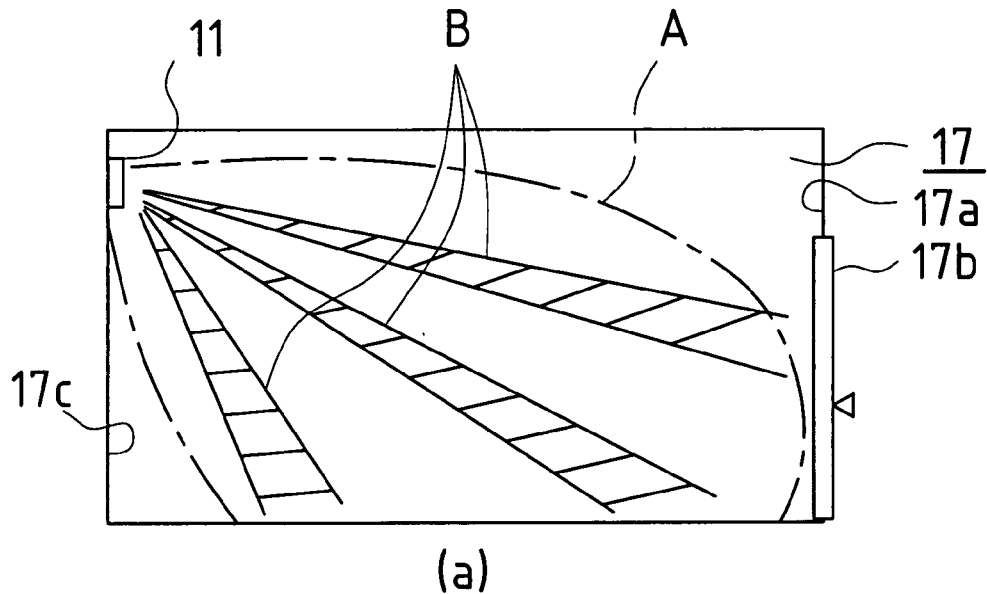
FIG. 5A is a side view showing a relationship between a unit installation position in a room where a combination sensor is installed and detection areas of an MW sensor and a PIR sensor.
Figure 5B:
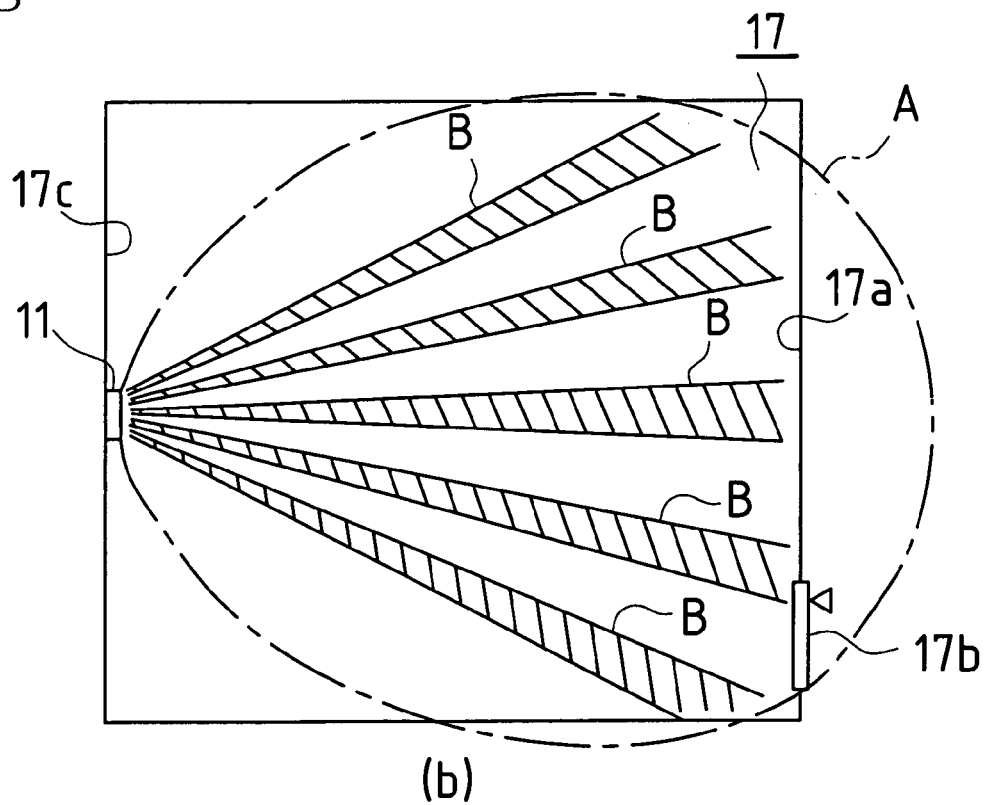
FIG. 5B is a top plan view thereof.

FIG. 5A and FIG. 5B are diagrams showing a relationship between a unit installation position in a room (e.g., a warehouse and the like) where the combination sensor 11 is installed and the sensing areas of the MW sensor 1 and the PIR sensor 14, and FIG. 5A is a side view and FIG. 5B is a top plan view. In FIG. 5A, the combination sensor 11 is installed on an upper part of a wall 17c opposed to a door 17b out of walls 17a forming a room 17. An area A shown by a dashed line in the figure is the sensing area of the MW sensor 1. Areas B . . . B added with diagonal lines are the sensing areas of the PIR sensor 14. The sensing area B is such that the Fresnel lens 16 covers the room 17 with multiple beams, and the sensing area A of the MW sensor 1 overlaps with the sensing area B of the PIR sensor 14.

Figure 6:
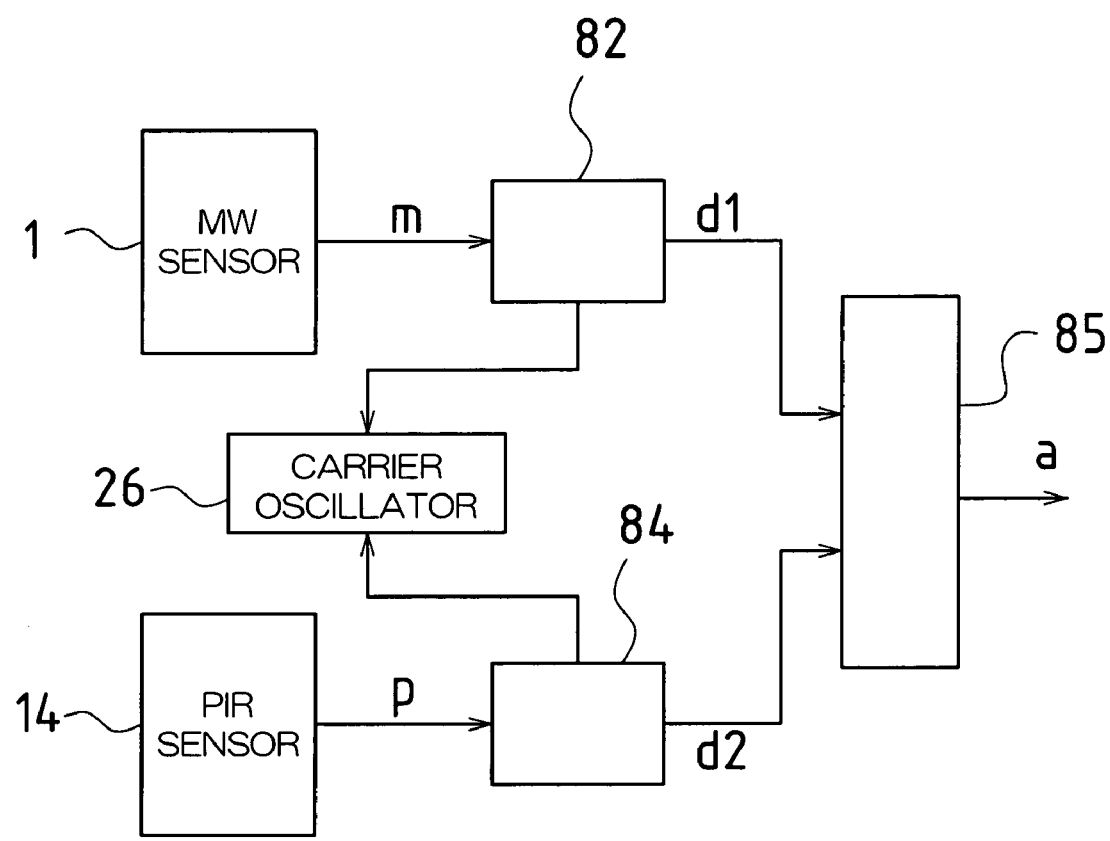
FIG. 6 is a block diagram showing a system configuration of a security system provided with a combination sensor.

FIG. 6 is a block diagram showing a system configuration of a security system provided with the combination sensor 11. As shown in FIG. 6, in the security system, a human body detection signal m detected by the MW sensor 1 is input to a first detection circuit 82. On the other hand, a human body detection signal p detected by the PIR sensor 14 is input to a second detection circuit 84.

When each of the human body detection signals m and p exceeds predetermined threshold values respectively, detections signals d1 and d2 are individually output from each of the detection circuits 82 and 84 to a determination circuit 85. Therefore, the first detection circuit 82 is a circuit detecting whether an intruder exists or not from the human body detection signal m. The first detection circuit 82 outputs the detection signal d1 to the determination circuit 85 when the level of the human body detection signal m exceeds the predetermined threshold value. On the other hand, the second detection circuit 84 is a circuit detecting whether an intruder exists or not from the human body detection signal p. The second detection circuit 84 outputs the detection signal d2 to the determination circuit 85 when the level of the human body detection signal p exceeds the predetermined threshold value.

The determination circuit 85 performs a calculation for each of the detection signal d1 and d2 input within predetermined time period, and if the calculation result is no more than a predetermined numerical value determined based on actual measurement data, the determination circuit 85 decides that an intruder exists and outputs an alert signal a. In this way, a security company is alerted via a central control apparatus of the system.

A characteristic of the embodiment is that the transmission status of the sensing signal wave of the MW sensor 1 is changed depending on whether an object exists in the detection target area or not, as is the case with the first embodiment described above. Hereinafter, descriptions are made in detail.

As is the case with the first embodiment, the microwave oscillated by the MW sensor 1 is transmitted to the detection target area with a carrier wave (carrier) consisting of a pulse wave.

The carrier oscillator 26 (the almost same device as the first embodiment) provided in the combination sensor 11 can receive the detection signals d1 and d2 from each of the first detection circuit 82 and the second detection circuit 84 and is configured such that pulse intervals of the carrier wave is changed when only the MW sensor 1 generates an alert (the case that only the MW sensor 1 decides that the detection target object exists in the detection target area), when only the PIR sensor 14 generates an alert (the case that only the PIR sensor 14 decides that the detection target object exists in the detection target area), when both sensors 1 and 14 generate alerts (the case that both sensors 1 and 14 decide that the detection target object exists in the detection target area) and when both sensors 1 and 14 do not generate alerts (the case that both sensors 1 and 14 decide that the detection target object does not exist in the detection target area), respectively.

Figure 7A:
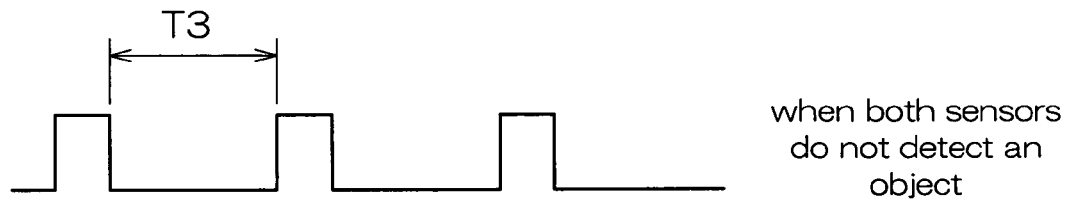
FIG. 7A is a diagram showing a changing status of a pulse interval of a pulse waveform of a carrier wave when both sensors does not generate an alert.
Figure 7B:
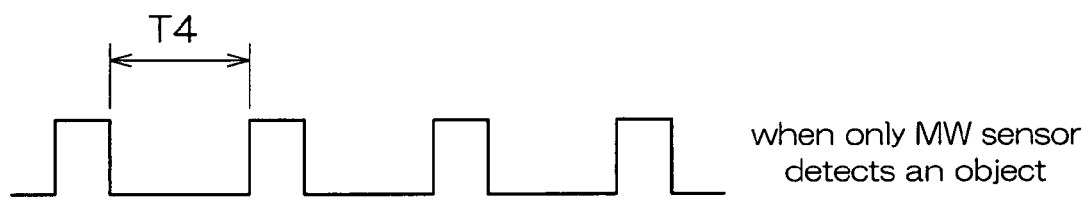
FIG. 7B is a diagram showing a changing status of the pulse interval of the pulse waveform of the carrier wave when only an MW sensor generates an alert.
Figure 7C:
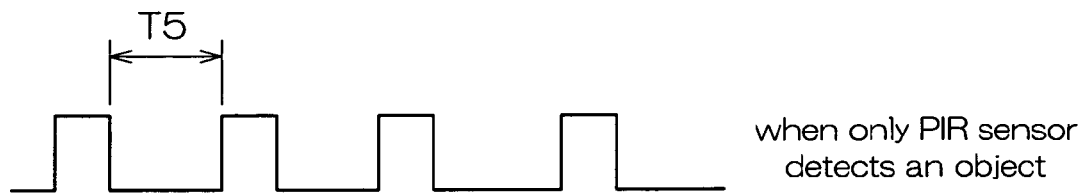
FIG. 7C is a diagram showing a changing status of the pulse interval of the pulse waveform of the carrier wave when only a PIR sensor generates an alert.
Figure 7D:
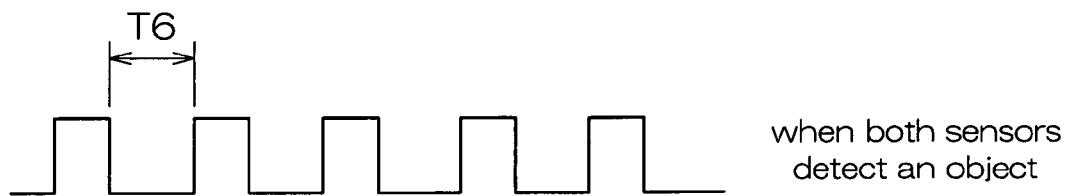
FIG. 7D is a diagram showing a changing status of the pulse interval of the pulse waveform of the carrier wave when both sensors generate alerts.

Specifically, as shown in FIG. 7A to FIG. 7D, the intervals are set to be shorter in the order of pulse intervals (T3) of the carrier wave when both sensors 1 and 14 do not generate alerts (see FIG. 7A), pulse intervals (T4) of the carrier wave when only the MW sensor 1 generates an alert (see FIG. 7B), pulse intervals (T5) of the carrier wave when only the PIR sensor 14 generates an alert (see FIG. 7C) and pulse intervals (T6) of the carrier wave when both sensors 1 and 14 generate alerts (see FIG. 7D).

On the other hand, a receiver (not shown) of the embodiment performs display depending on the pulse intervals of the carrier wave such that the status of generating an alert can be identified for each sensor 1 and 14.

Due to such a configuration, in the embodiment, the sensing areas can be checked for each of the MW sensor 1 and the PIR sensor 14 individually and simultaneously at hand by the operator. Therefore, also in the embodiment, the conventional configuration such as providing a light-emitting unit or a speaker in each of the sensors 1 and 14 is not required so as to eliminate deterioration of the design of the sensors 1 and 14, the increase of the power consumption of a built-in battery and occurrences of noise problems, and the operator can accurately check the sensing area alone.

Also in the embodiment, the invention is not limited to varying the pulse intervals of the carrier wave, and pulse length of the carrier wave may be varied, or pulse amplitude of the carrier wave (the output level of the carrier wave) may be varied. Also, when the microwave is continuously output, the frequency or the phase of the microwave may be varied between when the MW sensor 1 detects an object and when the MW sensor 1 does not detect an object (e.g., when the transition occurs from the state of not detecting an object to the state of detecting an object, the phase may be inverted). Further, the continuous output may be changed to the intermittent output (e.g., the continuous output is used in the non-detection state and the intermittent output is used in the detection state).

[Other Embodiments]

In embodiments described above, descriptions are made for a sensor system using the MW sensor 1 utilizing two (2) microwaves with different frequencies. The invention is not limited to this and may be applied to a sensor system using the MW sensor 1 utilizing one (1) microwave or to a sensor system using the MW sensor 1 utilizing more than two (2) microwaves with different frequencies.

The sensor system according to the invention can be utilized in applications other than the security application (application as a sensor for an automatic door).

Also, in each application described above, the receiver 4 is provided with a monitor screen and the operator checks the monitor display to check the sensing area. The invention is not limited to this and the operator may check sounds from a speaker to check the sensing area.

The invention can be implemented in various other ways without departing from the spirit and major characteristics thereof. Therefore, above embodiments are merely exemplifications in all respects and shall not be construed as limitations. The range of the invention is indicated by the claims and by no means bounded by body texts of the specification. Further, all modifications and alterations belonging to an equivalent range of the claims are within the range of the invention.

What is claimed is:

1. A sensor system comprising a sensor apparatus transmitting a sensing signal wave to a detection target area to recognize presence of a detection target object in the detection target area, wherein:
   the sensor apparatus varies a transmission status of the sensing signal wave between the case of deciding that the detection target object does not exist in the detection target area and the case of deciding that the detection target object exists in the detection target area, comprising:
   a reception apparatus having an identification means for identifying the transmission status of the sensing signal wave by receiving the sensing signal wave and a notification means for receiving a signal from the identification means to notify whether the sensor apparatus decides that the detection target object exists in the detection target area or not.

2. A sensor system of claim 1, wherein:
   the sensing signal wave consists of a carrier wave consisting of a pulse wave and a sensing wave carried by the carrier wave; and
   the sensor apparatus varies at least one of a pulse interval, pulse length and pulse amplitude of the carrier wave between the case of deciding that the detection target object does not exist in the detection target area and the case of deciding that the detection target object exists in the detection target area.

3. A sensor system of claim 1, wherein:
   the sensing signal is a sensing wave output continuously; and
   the sensor apparatus varies at least one of a frequency, a changeover from the continuous output to the intermittent output and a phase of the sensing wave between the case of deciding that the detection target object does not exist in the detection target area and the case of deciding that the detection target object exists in the detection target area.

4. A sensor system of claim 1, wherein:
   the sensor apparatus is a combination sensor comprising a microwave sensor for transmitting a microwave to the detection target area and for receiving a reflected wave which is the microwave reflected by the detection target object and modulated by the Doppler Effect if the detection target object exists in the detection target area and an infrared sensor for receiving infrared radiations from the detection target object existing in the detection target area to detect the detection target object, which generates an alert if the both sensors detect the detection target object; and
   the sensor apparatus varies the transmission status of the sensing signal wave when only the microwave sensor decides that the detection target object exists in the detection target area, when only the infrared sensor decides that the detection target object exists in the detection target area, when both sensors decide that the detection target object exists in the detection target area and when both sensors decide that the detection target object does not exist in the detection target area, respectively.

5. A sensor apparatus of claim 1, wherein:
   the transmission status of the sensing signal wave is varied between the case of deciding that the detection target object does not exist in the detection target area and the case of deciding that the detection target object exists in the detection target area.

6. A sensor apparatus of claim 5,
   consisting of a microwave sensor for transmitting a microwave to the detection target area and for recognizing the presence of the detection target object by receiving a reflected wave which is the microwave reflected by the detection target object and modulated by the Doppler Effect if the detection target object exists in the detection target area.

7. A reception apparatus of claim 1, comprising:
   an identification means for identifying the transmission status of the sensing signal wave by receiving the sensing signal wave transmitted by the sensor apparatus and a notification means for receiving a signal from the identification means to notify whether the sensor apparatus decides that the detection target object exists in the detection target area or not.

8. A sensor system of claim 2, wherein:
   the sensor apparatus is a combination sensor comprising a microwave sensor for transmitting a microwave to the detection target area and for receiving a reflected wave which is the microwave reflected by the detection target object and modulated by the Doppler Effect if the detection target object exists in the detection target area and an infrared sensor for receiving infrared radiations from the detection target object existing in the detection target area to detect the detection target object, which generates an alert if the both sensors detect the detection target object; and
   the sensor apparatus varies the transmission status of the sensing signal wave when only the microwave sensor decides that the detection target object exists in the detection target area, when only the infrared sensor decides that the detection target object exists in the detection target area, when both sensors decide that the detection target object exists in the detection target area and when both sensors decide that the detection target object does not exist in the detection target area, respectively.

9. A sensor system of claim 3, wherein:

the sensor apparatus is a combination sensor comprising a microwave sensor for transmitting a microwave to the detection target area and for receiving a reflected wave which is the microwave reflected by the detection target object and modulated by the Doppler Effect if the detection target object exists in the detection target area and an infrared sensor for receiving infrared radiations from the detection target object existing in the detection target area to detect the detection target object, which generates an alert if the both sensors detect the detection target object; and the sensor apparatus varies the transmission status of the sensing signal wave when only the microwave sensor decides that the detection target object exists in the detection target area, when only the infrared sensor decides that the detection target object exists in the detection target area, when both sensors decide that the detection target object exists in the detection target area and when both sensors decide that the detection target object does not exist in the detection target area, respectively.

10. A sensor apparatus of claim 2, wherein:

the transmission status of the sensing signal wave is varied between the case of deciding that the detection target object does not exist in the detection target area and the case of deciding that the detection target object exists in the detection target area.

11. A sensor apparatus of claim 3, wherein:

the transmission status of the sensing signal wave is varied between the case of deciding that the detection target object does not exist in the detection target area and the case of deciding that the detection target object exists in the detection target area.

12. A sensor apparatus of claim 4, wherein:

the transmission status of the sensing signal wave is varied between the case of deciding that the detection target object does not exist in the detection target area and the case of deciding that the detection target object exists in the detection target area.

13. A reception apparatus of claim 2, comprising:

an identification means for identifying the transmission status of the sensing signal wave by receiving the sensing signal wave transmitted by the sensor apparatus and a notification means for receiving a signal from the identification means to notify whether the sensor apparatus decides that the detection target object exists in the detection target area or not.

14. A reception apparatus of claim 3, comprising:

an identification means for identifying the transmission status of the sensing signal wave by receiving the sensing signal wave transmitted by the sensor apparatus and a notification means for receiving a signal from the identification means to notify whether the sensor apparatus decides that the detection target object exists in the detection target area or not.

15. A reception apparatus of claim 4, comprising:

an identification means for identifying the transmission status of the sensing signal wave by receiving the sensing signal wave transmitted by the sensor apparatus and a notification means for receiving a signal from the identification means to notify whether the sensor apparatus decides that the detection target object exists in the detection target area or not.

* * * * *